United States Patent
Blake et al.

(10) Patent No.: US 6,793,878 B2
(45) Date of Patent: Sep. 21, 2004

(54) COBALT-BASED HARD FACING ALLOY

(76) Inventors: Wayne C. Blake, 16 Cooke Rd., Wallingford, CT (US) 06492; James E. Arnold, 35 Elmer St., New Haven, CT (US) 06512

( * ) Notice: Subject to any disclaimer, the term of this patent is extended or adjusted under 35 U.S.C. 154(b) by 163 days.

(21) Appl. No.: 10/021,107

(22) Filed: Oct. 29, 2001

(65) Prior Publication Data

US 2002/0168285 A1 Nov. 14, 2002

Related U.S. Application Data

(60) Provisional application No. 60/243,306, filed on Oct. 27, 2000, and provisional application No. 60/248,351, filed on Nov. 15, 2000.

(51) Int. Cl.$^7$ .............................................. C22C 19/07
(52) U.S. Cl. ...................................................... 420/436
(58) Field of Search ................................. 420/436, 440

(56) References Cited

U.S. PATENT DOCUMENTS

| | | | | |
|---|---|---|---|---|
| 1,057,423 A | * | 4/1913 | Haynes | ....................... 148/436 |
| 4,058,415 A | * | 11/1977 | Walter | .......................... 148/32 |
| 4,437,913 A | * | 3/1984 | Fukui et al. | ................. 148/408 |
| 5,242,758 A | * | 9/1993 | Hitchcock et al. | ........... 428/547 |
| 5,422,072 A | * | 6/1995 | Mitsuhashi et al. | .......... 420/436 |
| 6,485,678 B1 | * | 11/2002 | Liang et al. | ................... 420/37 |

* cited by examiner

*Primary Examiner*—Daniel Jenkins
(74) *Attorney, Agent, or Firm*—John J. Daniels, Esq.

(57) ABSTRACT

A cobalt-based alloy composition having a relatively small lanthanum addition and relatively large carbon content provides remarkable oxidation resistance and wear resistance at high temperatures. The cobalt-based alloy composition has a suitable combination of ductility and wear resistance at high temperatures to be effective as a hard face material for limiting the effects of chattering of blades during the operation of a gas turbine engine. Further, the cobalt-based alloy has a suitable combination of ductility, oxidation resistance and wear resistance and thus represents an improved hard facing material for the blade components of gas turbine engine.

2 Claims, 2 Drawing Sheets

COBALT-BASED HARD FACING ALLOY

CROSS REFERENCE TO RELATED APPLICATIONS

This is the U.S. Utility application of Provisional Application Serial No. 60/243,306 filed Oct. 27, 2000 and Provisional Application Serial No. 60/248,351 filed Nov. 15, 2000.

BACKGROUND OF THE INVENTION

The present invention pertains to a cobalt-based hard facing alloy. More particularly, the present invention pertains to a cobalt-based hard facing alloy useful as a facing or coating for substrate materials. The inventive cobalt-based hard facing alloy is particularly useful as a hard facing material for gas turbine engine components, such as the shrouds of a gas turbine engine blade.

Figure 1:
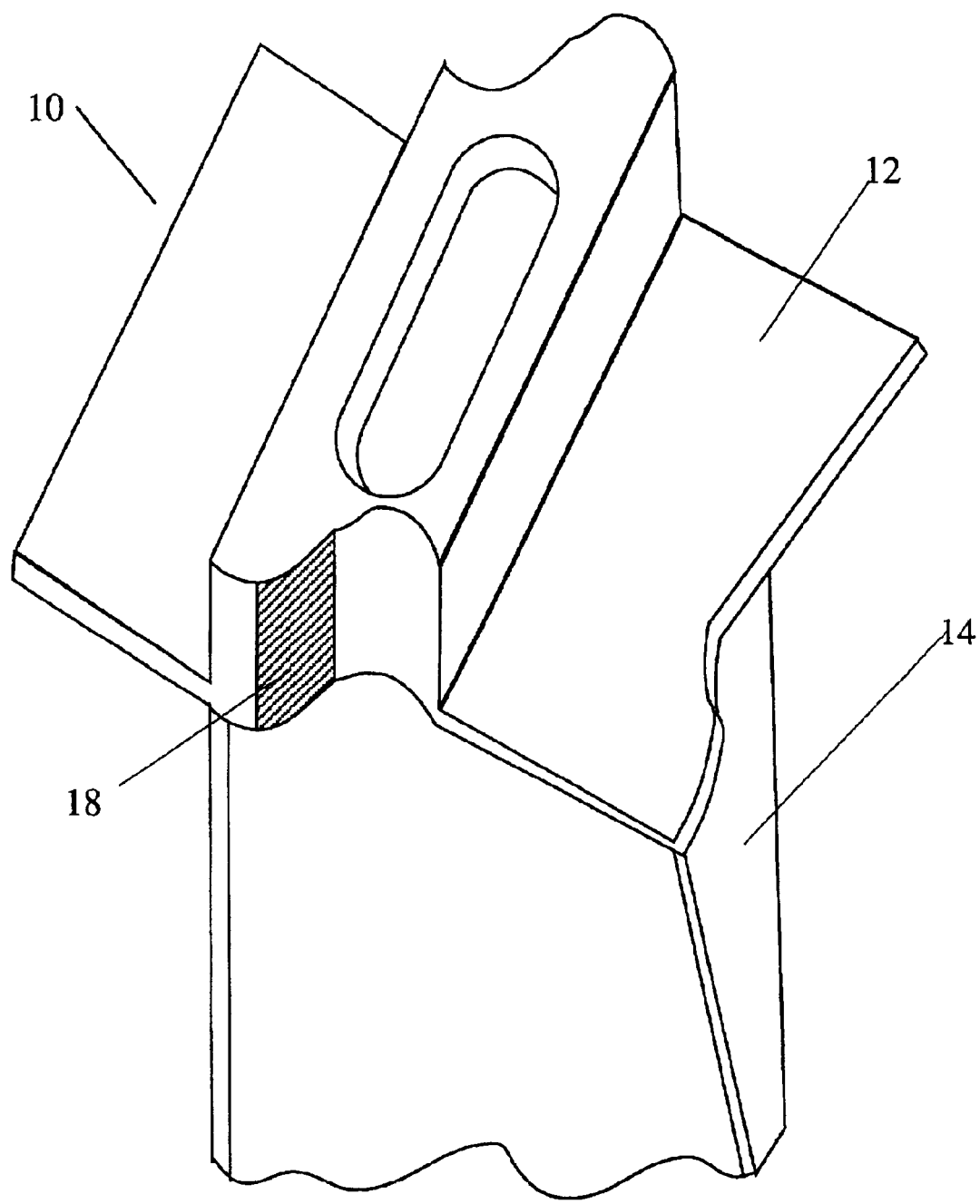

Airfoil parts, such as blades, are critical components in the gas turbine engines that are used to power jet aircraft or for the generation of electricity. As shown in FIG. 1, each blade 10 is an individual unit having a shroud section 12 and an airfoil section 14. The airfoil section 14 has specific cordal and length dimensions that define the airfoil characteristics of the part. The shroud section 12 is engaged with and held by an annular housing member (not shown). A plurality of interlocking blades are thus assembled with the housing member to form a disc. In the operating gas turbine engine the assembled discs, which are rotating parts, determine the path of the intake, combustion and exhaust gasses that flow through the engine.

Figure 2:
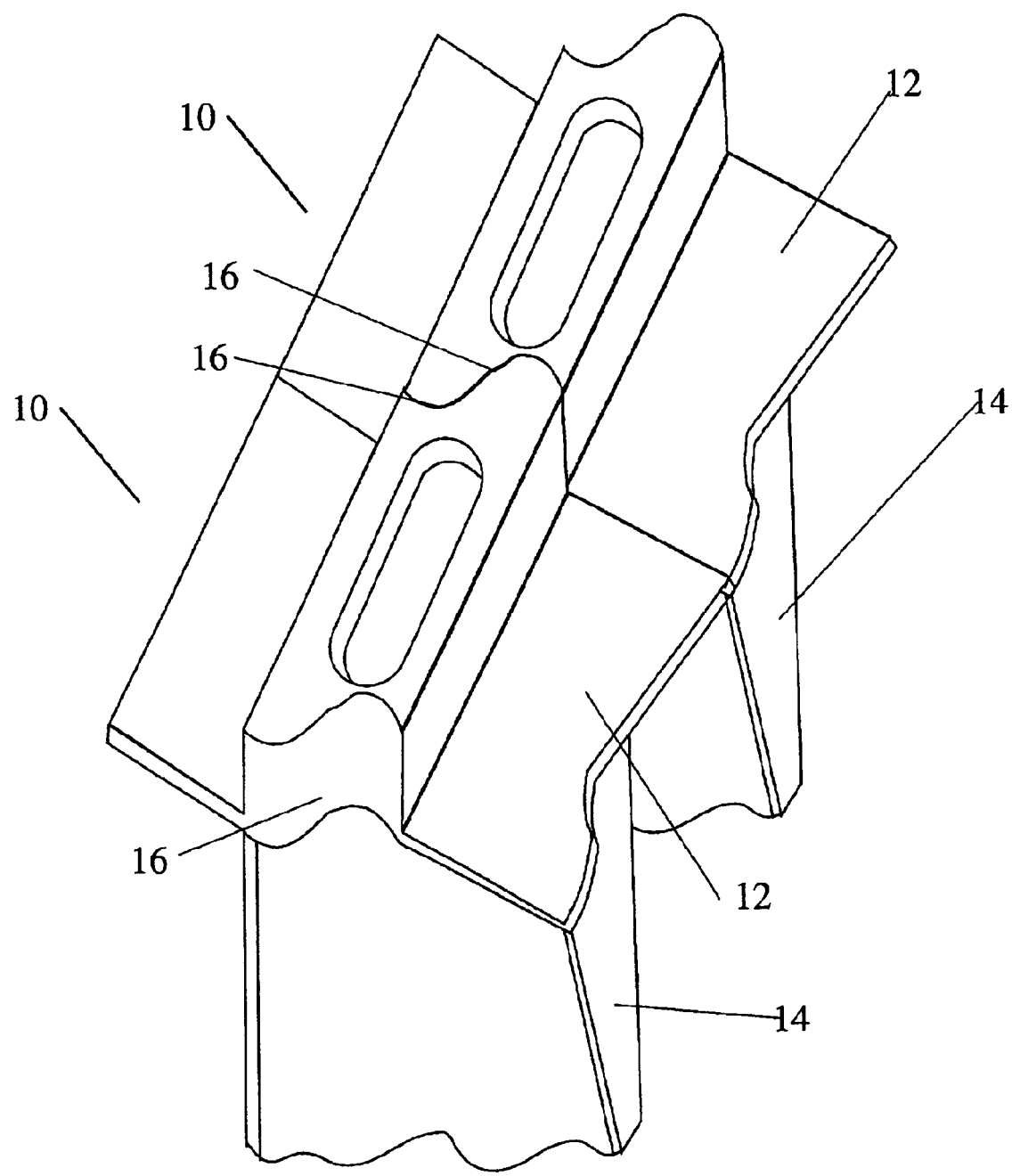

FIG. 2 shows two adjacent blades 10 of an assembled disc. The blades are held in the housing member (not shown) such that surfaces 16 of each shroud section 12 contacts corresponding surfaces 16 of adjacent shrouds. These contact surfaces 16 are subjected to wearing forces during the operation of the gas turbine engine. As an assembled disc of blades rotates, the individual adjacent blades 10 may chatter against each other, causing wear to occur at the contact surfaces 16 of the shroud sections 12. This chattering results in constant hammering at the contact surfaces 16 of the interlocking blades 10. Excessive wear in the area of the contact surfaces 16 can have detrimental consequences on the operation of the gas turbine engine, and thus is an area of concern.

To combat the excessive wear in the area of the contact surfaces of the shrouds, it has been conventional practice to apply a hard facing material to the shroud in the location of the contact surfaces. FIG. 1 shows a typical location for the application of a hard facing material 18. The hard facing material is applied to the shroud by, for example, manual tig welding or laser welding.

A conventional hard facing material for use on the blade of gas turbine engines consists of an alloy containing chromium, tungsten, nickel and cobalt. U.S. Pat. No. 3,265,434, issued to Baldwin, teaches an alloy for high temperature use containing chromium, tungsten, nickel and cobalt. Baldwin specifically teaches an alloy with improved short time tensile strength at 1800° F., wherein the ratio of cobalt to chromium is always at least 1.4:1. Baldwin further teaches that an alloy with optimum characteristics, from the standpoint of a combination of ductility (freedom from brittleness), and wear resistance, were obtained with a nickel content in the range of 4 to 6%. The composition taught by Baldwin has a short time tensile strength at 1800° F. of 48,000 p.s.i.

U.S. Pat. No. 3,582,320, issued to Herchenroeder, teaches a cobalt base alloy having superior oxidation and wear resistance. Herchenroeder teaches that a relatively small lanthanum addition and a relatively large carbon content provides remarkable oxidation resistance and wear resistant properties at high temperatures. The composition taught by Herchenroeder has an ultimate tensile strength of 15,700 p.s.i.

U.S. Pat. No. 3,947,269, issued to Prasse et al., teaches a boron-hardened tungsten facing alloy used as a facing or coating for base material, and in particular as a piston ring facing. The alloy taught be Prasse et al. is applied as a metal powder that is melted and sprayed upon a workpiece, such as a piston ring of a high compression combustion engine.

To be effective for use in the demanding environments subjected to the blades in an operating gas turbine engine, a hard facing material must have superior oxidation and wear resistance at elevated temperatures. Further, the hard facing material must have a suitable degree of ductility to withstand the constant hammering caused by chattering blades. Therefore, an improved hard facing material for the blade components of gas turbine engine blades will have a suitable combination of ductility, oxidation resistance and wear resistance.

SUMMARY OF THE INVENTION

It is an object of the present invention to overcome the drawbacks of the prior art and to provide a hard facing material having a superior combination of ductility, oxidation resistance and wear resistance. It is another object of the present invention to provide a cobalt-based alloy that is particularly useful as a hard facing material for gas turbine engine components, such as the shrouds of a gas turbine engine blade. It is still another object of the present invention to provide a cobalt-based alloy that is particularly useful as a hard facing material for piston engine rings.

In accordance with the present invention, a cobalt-based alloy is provided that is particularly useful as a hard facing material for gas turbine engine components, such as the shrouds of a gas turbine engine blade.

In accordance with the present invention, an alloy composition as described herein having a relatively small lanthanum addition and relatively large carbon content provides remarkable oxidation resistance and wear resistance at high temperatures. Further, the inventive alloy composition has a suitable combination of ductility and wear resistance at high temperatures to be effective as a hard face material for limiting the effects of chattering of blades during the operation of a gas turbine engine. Accordingly, the inventive alloy has a suitable combination of ductility, oxidation resistance and wear resistance and thus represents an improved hard facing material for the blade components of gas turbine engine.

DETAILED DESCRIPTION OF THE INVENTION

The present invention pertains to a cobalt-based hard facing alloy useful as a facing or coating for substrate materials. The inventive cobalt-based hard facing alloy is particularly useful as a hard facing material for gas turbine engine components, such as the shrouds of a gas turbine engine blade. Hard facing material is typically used on the critical components in a gas turbine engines that are used to power jet aircraft or for the generation of electricity.

In FIG. 2 two adjacent blades 10 are shown of an assembled disc. The blades are held in the housing member (not shown) such that surfaces 16 of each shroud section 12 contacts corresponding surfaces 16 of adjacent shrouds. These contact surfaces 16 are subjected to wearing forces during the operation of the gas turbine engine. As an assembled disc of blades rotates, the individual adjacent blades 10 may chatter against each other, causing wear to occur at the contact surfaces 16 of the shroud sections 12. This chattering results in constant hammering at the contact surfaces 16 of the interlocking blades 10. Excessive wear in the area of the contact surfaces 16 can have detrimental consequences on the operation of the gas turbine engine, The present invention provides a particularly durable and effective hard facing material to combat the excessive wear in the area of the contact surfaces of the shrouds. FIG. 1 shows a typical location for the application of a hard facing material 18. The hard facing material is applied to the shroud by, for example, manual tig welding or laser welding.

In accordance with the present invention, a cobalt-based alloy is provided that is particularly useful as a hard facing material for gas turbine engine components, such as the shrouds of a gas turbine engine blade. The alloy compositions as described herein have a relatively small lanthanum addition and relatively large carbon content and provide remarkable oxidation resistance and wear resistance at high temperatures. Importantly, the inventive alloy composition has a suitable combination of ductility and wear resistance at high temperatures to be effective as a hard face material for limiting the effects of chattering of blades during the operation of a gas turbine engine. Accordingly, the inventive alloy has a suitable combination of ductility, oxidation resistance and wear resistance and thus represents an improved hard facing material for the blade components of gas turbine engine.

In accordance with one embodiment of the present invention, a cobalt-based alloy is provided having essentially the following composition:

|  | Percent |
| --- | --- |
| Carbon | 0.07–1.00 |
| Manganese | 1.00 |
| Silicon | 1.00 |
| Chromium | 26.00–30.00 |
| Nickel | 4.00–6.00 |
| Tungsten | 18.00–21.00 |
| Boron | .005–0.100 |
| Vanadium | 0.75–1.25 |
| Iron | 3.00 |
| Lanthanum | 0.02–0.12 |
| Cobalt | remainder |

In accordance with another embodiment of the present invention, a cobalt-based alloy is provided having essentially the following composition:

|  | Percent |
| --- | --- |
| Carbon | 0.08 max |
| Silicon | 3.00–3.80 |
| Phosphorus | 0.03 max |
| Sulfur | 0.03 max |

-continued

|  | Percent |
| --- | --- |
| Chromium | 16.50–18.50 |
| Molybdenum | 27.00–30.00 |
| Nickel + Iron | 3.00 max |
| Nitrogen | 0.07 max |
| Oxygen | 0.05 max |
| Lanthanum | 0.02–0.12 |
| Cobalt | remainder |

What is claimed is:

1. A hardface material composition having improved oxidation and wear resistance at elevated temperatures consisting essentially in weight percent of about:

|  | Percent |
| --- | --- |
| Carbon | 0.08 max |
| Silicon | 3.00–3.80 |
| Phosphorus | 0.03 max |
| Sulfur | 0.03 max |
| Chromium | 16.50–18.50 |
| Molybdenum | 27.00–30.00 |
| Nickel + Iron | 3.00 max |
| Nitrogen | 0.07 max |
| Oxygen | 0.05 max |
| Lanthanum | 0.02–0.12 |
| Cobalt | remainder |

2. A shroud for an airfoil part of a gas turbine engine, comprising: an interlocking section of a shroud for an airfoil part of a gas turbine engine; a contact area provided at an area of the interlocking section that come in contact with another part of the gas turbine engine, the contact area having a hardface surface, the hardface surface comprising a hardface material composition having improved oxidation and wear resistance at elevated temperature, the hardface material composition being comprised of an alloy having a relatively small lanthanum addition and a carbon content wherein the hardface material composition comprises an alloy characterized by improved oxidation and wear resistance at elevated temperatures consisting essentially in weight percent of about:

|  | Percent |
| --- | --- |
| Carbon | 0.08 max |
| Silicon | 3.00–3.80 |
| Phosphorus | 0.03 max |
| Sulfur | 0.03 max |
| Chromium | 16.50–18.50 |
| Molybdenum | 27.00–30.00 |
| Nickel + Iron | 3.00 max |
| Nitrogen | 0.07 max |
| Oxygen | 0.05 max |
| Lanthanum | 0.02–0.12 |
| Cobalt | remainder |

* * * * *